United States Patent [19]
Tani et al.

[11] Patent Number: 5,698,143
[45] Date of Patent: Dec. 16, 1997

[54] METHOD FOR THE PREPARATION OF SILICON CARBIDE-BASED COMPOSITE CERAMIC BODY WITH FIBER REINFORCEMENT

[75] Inventors: Eiji Tani; Kazuhisa Shobu, both of Tosu, Japan

[73] Assignee: Japan as represented by Director General of Agency of Industrial Science and Technology, Tokyo-to, Japan

[21] Appl. No.: 548,042

[22] Filed: Oct. 25, 1995

[30] Foreign Application Priority Data

Nov. 15, 1994 [JP] Japan .................................. 6-306825

[51] Int. Cl.⁶ .......................... C04B 35/571; C04B 35/80
[52] U.S. Cl. .................... 264/29.1; 264/29.6; 264/625; 264/641
[58] Field of Search ......................... 264/29.1, 63, 29.6, 264/625, 641

[56] References Cited

U.S. PATENT DOCUMENTS

| | | | |
|---|---|---|---|
| 4,837,230 | 6/1989 | Chen et al. | 264/60 |
| 5,190,709 | 3/1993 | Lukacs | 264/63 |
| 5,294,460 | 3/1994 | Tani | 427/228 |

*Primary Examiner*—James Derrington
*Attorney, Agent, or Firm*—Wenderoth, Lind & Ponack

[57] ABSTRACT

Disclosed is a method for the preparation of a fiber-reinforced silicon carbide-based composite ceramic body having outstandingly high mechanical strengths even without using any sintering aids or without undertaking the hot-press sintering method. The method comprises impregnating carbon fibers or silicon carbide fibers with a slurry containing an elementary silicon powder, an organic resin, e.g., phenolic resins, and an organosilicon polymer, e.g., polysilastyrenes, according to a specified formulation and shaping the impregnated fibers into a green body which is subjected to a calcination treatment at 1300°–1500° C. in an inert atmosphere under normal pressure.

7 Claims, No Drawings

METHOD FOR THE PREPARATION OF SILICON CARBIDE-BASED COMPOSITE CERAMIC BODY WITH FIBER REINFORCEMENT

BACKGROUND OF THE INVENTION

The present invention relates to a method for the preparation of a silicon carbide-based composite ceramic body with fiber reinforcement or, more particularly, to an improvement in the method for the preparation of a composite ceramic body consisting of silicon carbide as the matrix phase and reinforcing fibers of carbon or silicon carbide having outstandingly high mechanical strengths comparable to those of a similar body prepared by the hot-press sintering method in the prior art.

Silicon carbide-based ceramic bodies are highlighted and widely used in recent years by virtue of the inherently excellent properties of silicon carbide such as heat resistance, abrasion resistance, corrosion resistance and so on as a material of various structural members required to have high resistance against high temperatures, corrosion and abrasion as well as for use as an abrasive material.

One of the important problems relative to the silicon carbide-based ceramic bodies is the improvement of the toughness or tenacity thereof and extensive investigations are now under way in the direction of compounding the ceramic with a fibrous reinforcing material. Such a fiber-reinforced silicon carbide-based composite ceramic body is prepared by several methods including: (1) the hot-press method in which a blend of a silicon carbide powder and a fibrous reinforcing material is subjected to sintering under hot-pressing disclosed, for example, in Journal of Ceramic Society Japan, volume 100, page 472 (1992); (2) a method in which impregnation of a fibrous reinforcing material with an organo-metallic or organosilicon polymer is repeated each time followed by calcination disclosed, for example, in Journal of Ceramic Society Japan, volume 100, page 444 (1992); (3) the so-called chemical vapor infiltration (CVI) method disclosed, for example, in American Ceramic Society Bulletin, volume 66, page 368 (1987); and so on.

These prior art methods each have respective disadvantages. For example, the first method of hot-press sintering method has a problem that the sintering process must be conducted at an extremely high temperature of 1700° C. or higher even by the use of a sintering aid so that the mechanical strength of the reinforcing fibers, which can hardly withstand a temperature of 1500° C. or higher, unavoidably decreased if not to mention that this method is hardly applicable to the preparation of an article having a relatively complicated form. The second method by the repeated impregnation and calcination of the reinforcing fibers and the polymer requires five times or more of repetition of the cycles in order to obtain a sufficiently high density and hence mechanical strengths of the calcined body. This is because the density and mechanical strength obtained in a single cycle of polymer impregnation and calcination are far from satisfactory. Needless to say, the difficulty encountered in accomplishing completely uniform polymer impregnation to the core of the body is so great when the body has such a large thickness as to destroy the practicability of the method. The third method of chemical vapor infiltration has a disadvantage, though advantageous in respect of the relatively low processing temperature, e.g., 1100° C., and the adaptability of the method to the preparation of a body having a relatively complicated form, the process of vapor infiltration is very time-consuming and, in addition, the gaseous materials used in this method are sometimes toxic involving a risk against the workers' health.

The inventors have disclosed, in U.S. Pat. No. 5,294,460, an efficient method for the preparation of a silicon carbide-based composite ceramic body reinforced with carbon fibers by reactive sintering in which a green body prepared from a blend of a powder of metallic or elementary silicon, a phenolic resin and carbon fibers is subjected to calcination in an inert atmosphere. This method, however, is not quite satisfactory because the bending strength of the composite ceramic body obtained by this method can rarely exceed 300 MPa when calcination of the green body is performed under normal pressure.

SUMMARY OF THE INVENTION

The present invention accordingly has an object, in view of the above described problems and disadvantages in the prior art methods, to provide a novel and improved method for the preparation of a fiber-reinforced, silicon carbide-based composite ceramic body having mechanical strengths high enough to be comparable with the high values, which could be obtained in the prior art only by the hot-press sintering method, even by undertaking calcination of a green body under normal pressure so as to be applicable to the preparation of a ceramic body having a relatively complicated form.

Thus, the method of the present invention for the preparation of a fiber-reinforced, silicon carbide-based composite ceramic body comprises the steps of:

(a) mixing a powder of elementary silicon, an organic polymeric resin, an organosilicon polymer and inorganic fibers, e.g., carbon fibers and silicon carbide fibers, to give a blend;

(b) shaping the blend to give a green body; and (c) calcining the green body in an inert atmosphere at a temperature in the range from 1300° to 1500° C.

In particular, the above mentioned organic polymeric resin is selected, preferably, from the group consisting of phenolic resins, furan resins and pitches and the organosilicon polymer is selected, preferably, from polysilastyrenes, polycarbosilanes and polysilazanes.

DETAILED DESCRIPTION OF THE PREFERRED EMBODIMENTS

As is described above, the most characteristic feature of the inventive method consists in the formulation of the blend from which a green body is prepared by compression molding, filament winding or any other suitable methods. Namely, the blend is prepared from four kinds of ingredients of which the organosilicon polymer is unique as not taught nor suggested in the prior art method disclosed in U.S. Pat. No. 5,294,460. This ingredient is pyrolyzed at the calcination temperature to form silicon carbide or silicon nitride exhibiting an effect of greatly increasing the mechanical strengths of the calcined ceramic body.

The first ingredient in the blend is a powder of elementary silicon which should desirably have a particle diameter as small as possible in order to ensure intimacy of mixing with the reinforcing fibrous material. Preferably, the average particle diameter of the silicon powder is 5 μm or smaller. When the particle diameter of the silicon powder is too large, the particle size can be reduced by subjecting the powder to pulverization in a suitable machine such as ball mills either as such or after mixing with one or more of the other ingredients.

The second ingredient to form the blend is an organic resin which serves as a source of carbon to react with the elementary silicon forming silicon carbide. Examples of suitable organic resins include phenolic resins, furan resins and pitches though not particularly limitative thereto. The pitch can be a coal-tar pitch or petroleum pitch. These organic resins can be used either singly or as a combination of two kinds or more according to need.

The third ingredient to form the blend is an organosilicon polymer from which silicon carbide or silicon nitride is formed by pyrolysis at the calcination temperature. Examples of suitable organosilicon polymers include polysilastyrenes disclosed in Japanese Patent Publications 61-54329 and 62-9612, polycarbosilanes disclosed in Japanese Patent Kokai 51-126300 and polysilazanes disclosed in Japanese Patent Kokai 60-145903 though not particularly limitative thereto. These organosilicon polymers can be used either singly or as a combination of two kinds or more according to need. These organosilicon polymers are each a known material and several grades of commercial products are available on the market.

The fourth ingredient to form the blend is an inorganic fibrous material for reinforcing. Carbon fibers and silicon carbide fibers are suitable for the purpose. The carbon fibers can be those derived from a pitch material or those derived from polyacrylonitriles. These reinforcing fibers should have a fiber diameter in the range from 5 to 20 μm or, preferably, from 6 to 10 μm. Various grades of carbon fibers and silicon carbide fibers are available on the market and can be used as such without particular pre-treatment. The fibers can be filaments or staples but filaments are preferred. These fibrous materials can be used either singly or as a combination of two kinds or more according to need.

As to the blending proportion of the respective ingredients described above, it is important that the atomic ratio of silicon to carbon, derived from the first ingredient as the source of silicon, the second ingredient as the source of carbon and the third ingredient as the source of silicon and carbon, is as close to 1:1 as possible although the silicon-:carbon atomic ratio can be in the range from 40:60 to 60:40 or, preferably, from 45:55 to 55:45.

Further, the amount of the organosilicon polymer as the third ingredient is in the range from 10 to 90% by weight or, preferably, from 10 to 60% by weight based on the total amount of the silicon powder and the organosilicon polymer.

The amount of the inorganic fibrous reinforcing material is not particularly limitative depending on the particular shaping method of the green body of the blend, intended application of the composite ceramic body and other factors although, as a rough measure, the volume fraction of the fibrous reinforcing material in the composite ceramic body after calcination is in the range from 20 to 60% in the body after calcination.

A typical and preferable procedure for practicing the inventive method by the filament winding method is as follows. Thus, the organic resin and the organosilicon polymer are dissolved in a suitable organic solvent to give a solution to which the silicon powder is added to give a slurry. The inorganic fiber in the form of a filament as the reinforcing material is dipped in or passed through the slurry so as to be coated with the slurry to give a slurry-coated filament from which a shaped body is prepared by a known procedure of the filament winding method on a suitable core or mandrel followed by drying to remove the solvent and molding in a metal mold usually at 100° to 200° C. into a green body of the desired form.

Alternatively, the method of compression molding is of course applicable to the preparation of the green body. For example, a web, e.g., a woven cloth or non-woven fabric, of the reinforcing fibers is dipped in and impregnated with the slurry prepared in the above described manner followed by drying and the thus dried web impregnated with the composition of the first to third ingredients is then chopped into small pieces which are compression-molded in a metal mold to give a green body.

The green body prepared in the above described manner is then subjected to a calcination treatment in an atmosphere of an inert gas such as argon and nitrogen at a temperature in the range from 1300° to 1500° C. The length of time required for this calcination treatment depends on the formulation of the composite material, dimensions of the green body and other factors but it is usual that calcination is complete within several hours. By this calcination treatment, a reaction proceeds between the carbon produced by the thermal decomposition of the organic resin and the particles of the silicon powder to form silicon carbide along with formation of silicon carbide also from the organosilicon polymer so that a very uniform fiber-reinforced silicon carbide-based ceramic body can be obtained even without using any sintering aids.

In the following, examples are given to illustrate the inventive method in more detail although the scope of the invention is never limited thereby in any way.

EXAMPLE 1

Into 75 ml of methyl ethyl ketone were dissolved 11.08 g of a phenolic resin, of which the content of carbon was about 65% by weight, and 16.8 g of a polysilastyrene to give a solution which was admixed with 16.8 g of a silicon powder having an average particle diameter of about 15 μm to give a slurry. After ball-milling of the slurry for 3 days, the average particle diameter of the silicon particles in the slurry was determined to have been reduced to about 5 μm.

A web of carbon fibers impregnated with the slurry was prepared by the filament winding method in which a carbon filament having a diameter of about 10 μm was passed through the slurry and wound on a drum to form a layer followed by drying. The volume fraction of the carbon fibers was about 55% after drying. The impregnated carbon fiber web was chopped into pieces which were compression-molded at 140° C. into a molded green body having dimensions of 3 mm by 12 mm by 50 mm. This green body was subjected to a calcination treatment in an atmosphere of argon at 1450° C. for 1 hour to give a test piece of the fiber-reinforced silicon carbide-based composite ceramic body having dimensions of 2.9 mm by 11.5 mm by 50 mm, which was subjected to the measurements of the physical parameters to give the results including: bulk density of 1.9 $g/cm^3$; porosity for open pores of 20%; elastic modulus of 250 GPa and bending strength of 600 MPa. The volume fraction of the carbon fibers in this test specimen was about 55% as determined on an electron microscopic photograph of a cross section of the test specimen.

EXAMPLE 2

The experimental procedure was substantially the same as in Example 1 except that the amounts of the phenolic resin, silicon powder and polysilastyrene used in the preparation of the slurry were 20.5 g, 28.0 g and 7.0 g, respectively, corresponding to 20% by weight of the polysilastyrene based on the total amount of the silicon powder and the polysilastyrene. The results obtained by the measurements of the physical parameters of the thus obtained test specimen were: bulk density of 1.8 g/cm$^3$; porosity for open pores of 25%; elastic modulus of 190 GPa and bending strength of 400 MPa. The volume fraction of the carbon fibers in this test specimen was about 55%.

COMPARATIVE EXAMPLE 1

The experimental procedure was substantially the same as in Example 1 excepting omission of the polysilastyrene in the preparation of the slurry. The results obtained by the measurements of the physical parameters of the thus obtained test specimen were: bulk density of 1.7 g/cm$^3$; porosity for open pores of 30%; elastic modulus of 150 GPa and bending strength of 300 MPa. The volume fraction of the carbon fibers in this test specimen was about 45%.

COMPARATIVE EXAMPLE 2

The experimental procedure was substantially the same as in Example 1 except that the slurry used for impregnation of carbon fibers was prepared by dispersing the polysilastyrene alone in methyl ethyl ketone. The results obtained by the measurements of the physical parameters of the thus obtained test specimen were: bulk density of 1.4 g/cm$^3$; porosity for open pores of 40%; elastic modulus of 20 GPa and bending strength of 60 MPa. The volume fraction of the carbon fibers in this test specimen was about 40%.

What is claimed is:

1. A method for the preparation of a fiber-reinforced, silicon carbide-based composite ceramic body having a bending strength of at least 400 MPa which comprises the steps of:

(a) mixing a powder of elementary silicon, an organic polymeric resin selected from the group consisting of phenolic resins, furan resins and pitches, an organosilicon polymer and inorganic fibers to give a blend;

(b) shaping the blend into a green body; and (c) calcining the green body in an inert atmosphere at a temperature in the range from 1300° to 1500° C.

2. The method for the preparation of a fiber-reinforced, silicon carbide-based composite ceramic body as claimed in claim 1 in which the organosilicon polymer is selected from polysilastyrenes, polycarbosilanes and polysilazanes.

3. The method for the preparation of a fiber-reinforced, silicon carbide-based composite ceramic body as claimed in claim 1 in which the powder of elementary silicon has a particle diameter not exceeding 5 μm.

4. The method for the preparation of a fiber-reinforced, silicon carbide-based composite ceramic body as claimed in claim 1 in which the inorganic fibers are fibers of carbon or silicon carbide.

5. The method for the preparation of a fiber-reinforced, silicon carbide-based composite ceramic body as claimed in claim 1 in which the powder of elementary silicon, the organic polymeric resin and the organosilicon polymer are mixed together in such a proportion that the atomic ratio of carbon to silicon derived therefrom is in the range from 40:60 to 60:40.

6. The method for the preparation of a fiber-reinforced, silicon carbide-based composite ceramic body as claimed in claim 5 in which the amount of the organosilicon polymer is in the range from 10 to 90% by weight based on the total amount of the powder of elementary silicon and the organosilicon polymer.

7. The method for the preparation of a fiber-reinforced, silicon carbide-based composite ceramic body as claimed in claim 1 in which the inert atmosphere is an atmosphere of argon gas.

* * * * *